Jan. 4, 1966 W. C. FICHTER, JR 3,227,954

TRANSMIT-RECEIVE SWITCHING CIRCUIT UTILIZING DIODES

Filed May 7, 1963 2 Sheets-Sheet 1

INVENTOR.
Walter C. Fichter, Jr.
BY
Harry [signature]
ATTORNEY

Jan. 4, 1966 W. C. FICHTER, JR 3,227,954

TRANSMIT-RECEIVE SWITCHING CIRCUIT UTILIZING DIODES

Filed May 7, 1963 2 Sheets-Sheet 2

INVENTOR
Walter C. Fichter, Jr.

BY Harry [signature]

ATTORNEY 3,227,954

TRANSMIT-RECEIVE SWITCHING CIRCUIT UTILIZING DIODES

Walter C. Fichter, Jr., 33 Myrtle Ave., Cedar Grove, N.J.

Filed May 7, 1963, Ser. No. 278,690
9 Claims. (Cl. 325—22)

This invention relates to electronic switching circuits, both tuned and untuned, for directional control of radio frequency signals, so as to provide isolation of a high signal voltage from an associated low signal voltage circuit.

The invention is more specifically directed to, although not limited to, an electronic switching circuit for automatically switching a common antenna from a radio frequency transmitter to a radio frequency receiver and vice versa, during radio communication.

When transmitting at relatively high power levels, in order to use the same antenna for both transmitting and receiving, it is necessary to provide some means of isolating the transmitter signal voltage from the receiver antenna circuit. This is required in order to prevent loss of the transmitter signal voltage by R.F. dissipation in the receiver antenna circuit and also to prevent damage to the receiver. This may be accomplished by manual switching or it may be accomplished automatically using one of the following methods.

A. A relay may be used to switch the antenna, but relays are comparatively slow acting, noisy and subject to mechanical failure.

B. A gaseous discharge tube or a semiconductor diode may be used to load down the tuned radio frequency input to the receiver during transmission, as in the patent to Zarky 2,654,834, but this means consumes some transmitter power and is only practical at relatively low power levels.

C. A conventional electron receiving tube may be coupled to the antenna lead line via conventional electron receiving tube circuitry, the lead line being also coupled to the transmitter. During transmission, signal voltage rectified between the control grid and cathode of the receiving tube develops a negative potential at the grid which biases off the tube and protects the tube from over-conduction. This method is disadvantageous because rectification of the signal voltage causes spurious harmonic signals to be radiated, which may interfere with television and other signal services. Another disadvantage is that, because the signal voltage on the control grid of the electron tube must be relatively low, the control grid is coupled directly to the antenna lead line and without utilizing a tuned input. As the antenna lead line is also coupled to the transmitter tank circuit, the resonant section of the tank circuit acts as a signal absorption trap. This draws the signal voltage away from the receiver antenna circuit, during reception, weakening and degrading the received signal. These disadvantages and another possible solution are described in Patent No. 3,041,608.

D. A semiconductor diode may also be used as a switching means to isolate the high level transmitter signal voltage from the receiver antenna circuit during transmission.

It is a general object of this invention to couple a receiver antenna circuit to an antenna feed line, which is also coupled to a transmitter, in such a manner that, during reception, signal voltage absorption from the receiver by the transmitter tank circuit is eliminated.

It is a further object of this invention to provide for an increase in the receiver signal voltage even though the transmitter tank circuit is resonant at a frequency near that of the received signal.

A further object of the invention is to eliminate any appreciable consumption or rectification of the transmitter signal voltage by the switching circuit.

A still further object of the invention is to use a semiconductor diode in a radio frequency switching circuit, in a more simple and improved manner than that previously employed, so as to provide directional control and isolation of signal voltages.

These and other objects will be more fully understood after consideration of the following detailed description when taken in conjunction with the accompanying drawings in which.

Figure 1:
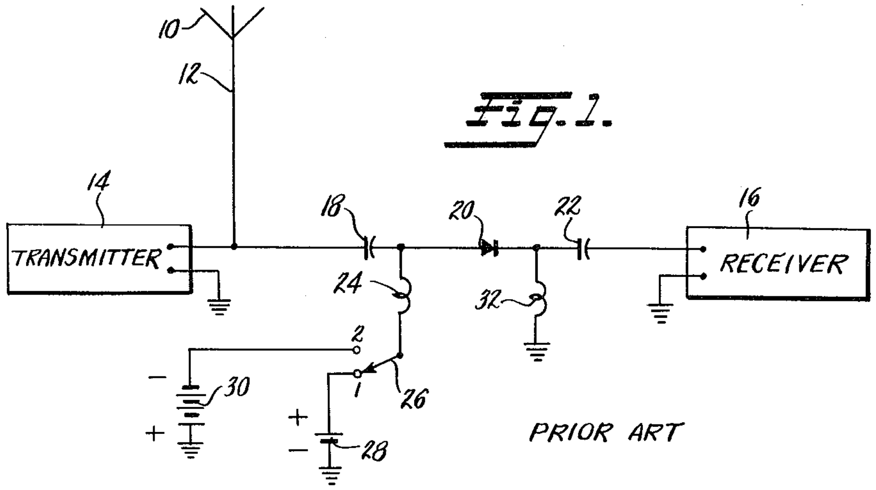
FIG. 1 is a schematic diagram of a prior art device utilizing a semiconductor diode in a switching device.

Now referring to the drawings in greater detail, in the prior art device of FIG. 1 there is illustrated an antenna 10 direct coupled via an antenna lead line 12 to a transmitter 14. Also coupled to the lead line is a receiver 16, the coupling from the lead line to the receiver being effected through series connected capacitor 18, semiconductor diode 20 and capacitor 22. An R.F. choke 24 is connected at one end in the connection between capacitor 18 and diode 20 and at its other end to the center terminal of a single pole, double throw switch 26 which switch may be operated to connect either with the positive end of a low potential direct current source or battery 28 or with the negative end of a higher potential direct current source or battery 30. A second R.F. choke 32 is connected, at one end, to the connection in between the diode and the receiver and at the other end to ground. The otherwise free ends of the batteries are grounded as are suitable terminals on the transmitter and receiver. In this prior art device when the switch 26 is in position 1, the diode is forward biased, current flowing from the battery 28 through choke 24, diode 20 and choke 32. It is generally known that a semiconductor in a forward biased condition has a very low impedance to the flow of radio frequency current. It is only necessary that the D.C. forward biasing current be at least equal to the radio frequency current. As a result, the antenna signal voltage is free to flow through the diode to the receiver antenna circuit. When the switch 26 is in position 2, the diode is reverse biased. It is also known that a semiconductor diode in a reverse biased condition has a very high impedance to the flow of radio frequency current. The reverse bias potential must be at least as great as the peak R.F. voltage to be isolated. The high diode impedance effectively isolates the transmitter signal voltage from the receiver antenna circuit, during transmission. The capacitors 18 and 2 prevent direct current application to the receiver and transmitter; the chokes 24 and 32 prevent loss of signal to ground. See the patent to Curtis 2,939,-949. No provision is made in such an organization to prevent signal absorption of an incoming signal by the transmitter, nor for amplification of the signal transmitted to the receiver. Nor does the arrangement provide efficient directional control and isolation of signal voltages, at signal levels higher than the reverse bias potential.

Figure 2:
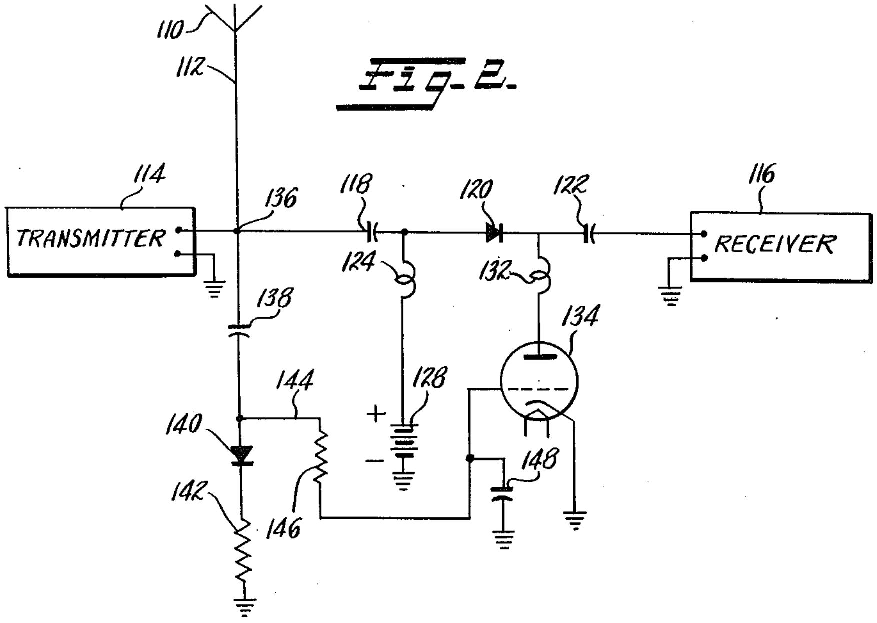
FIG. 2 is a diagram illustrating the basic principles in the functioning of the invention.

In FIG. 2 there is illustrated an antenna 110, antenna lead line 112, transmitter 114, receiver 116, capactor 118, diode 120 and capacitor 122 as well as chokes 124 and 132 in a very similar relationship to that disclosed in FIG. 1. The lower end of choke 124 is connected with the positive end of a D.C. source of potential, as battery 128, while the lower end of choke 132 is connected to the anode of electron tube 134. The juncture 136 between the transmitter 114 and the capacitor 118 is connected in series with a capacitor 138 and a high frequency semiconductor diode 140, with the diode oriented so that positive conduction of R.F. signal voltage through the diode and resistor 142 develops a negative potential at the diode anode and lead 144. This lead has inserted therein a series resistor 146 and by-pass capacitor 148 to filter current in the line 144 which has been rectified by the diode 140.

During transmission, a low R.F. potential is conducted from the antenna lead line through capacitor 138 to high frequency semiconductor diode 140. This R.F. potential, rectified by the diode 140 and filtered by resistor 146 and capacitor 148, causes a negative potential to develop across capacitor 148 and at the control grid of the electron tube 134. The negative potential thus developed cuts off direct current conduction through tube 134 and consequently through diode 120. As a result, diode 120 is no longer forward biased and there is no D.C. return path through diode 120. A unique feature of the invention circuit is that eliminating D.C. conduction through diode 120 by opening the D.C. return circuit through the tube 134, causes the diode to have the same high impedance to the flow of R.F. current as if the diode were in a reverse biased condition. The semiconductor diode 120 is a low frequency silicon diode power rectifier. Although the reverse bias phenomenon has not been investigated, it is believed that it is due to the slow recovery time of the low frequency diode. That is to say that the diode is reverse biased when the R.F. potential is in the negative portion of the R.F. cycle and that the slow recovery time permits the diode to remain in a reverse bias condition throughout the positive portion of the R.F. cycle. The electron tube 134 must have infinite resistance when it is biased off. Any D.C. conduction through tube 134 during transmission provides a D.C. return path for the diode 120, which permits R.F. to be rectified across it. This causes diode 120 to be regeneratively conductive and forward biased, resulting in breakdown of the semiconductor junction.

Although a specific type of semiconductor diode and a specific means of eliminating the D.C. return circuit through the diode has been described, the invention relates to the use of any semiconductor diode which displays the assimilated reverse bias characteristic described. The invention also applies regardless of the switching arrangement used to eliminate the diode D.C. return path.

As a result of the circuit arrangement disclosed it is apparent that the switching circuit is simplified in that no power supply is required to reverse bias the diode; the semiconductor diode 120 is not subject to failure because of the failure of a reverse bias potential source; the circuit is fail-safe from a power standpoint, since should either the tube be inoperative or if the potential source 128 should fail, the tube would be nonconductive, thereby eliminating any possibility of failure of diode 120; also, since there is no D.C. return path from diode 120 during transmission, no spurious R.F. signal could be radiated by the antenna due to diode detection, the diode being inoperative to rectify transmitted R.F. signals.

Figure 3:
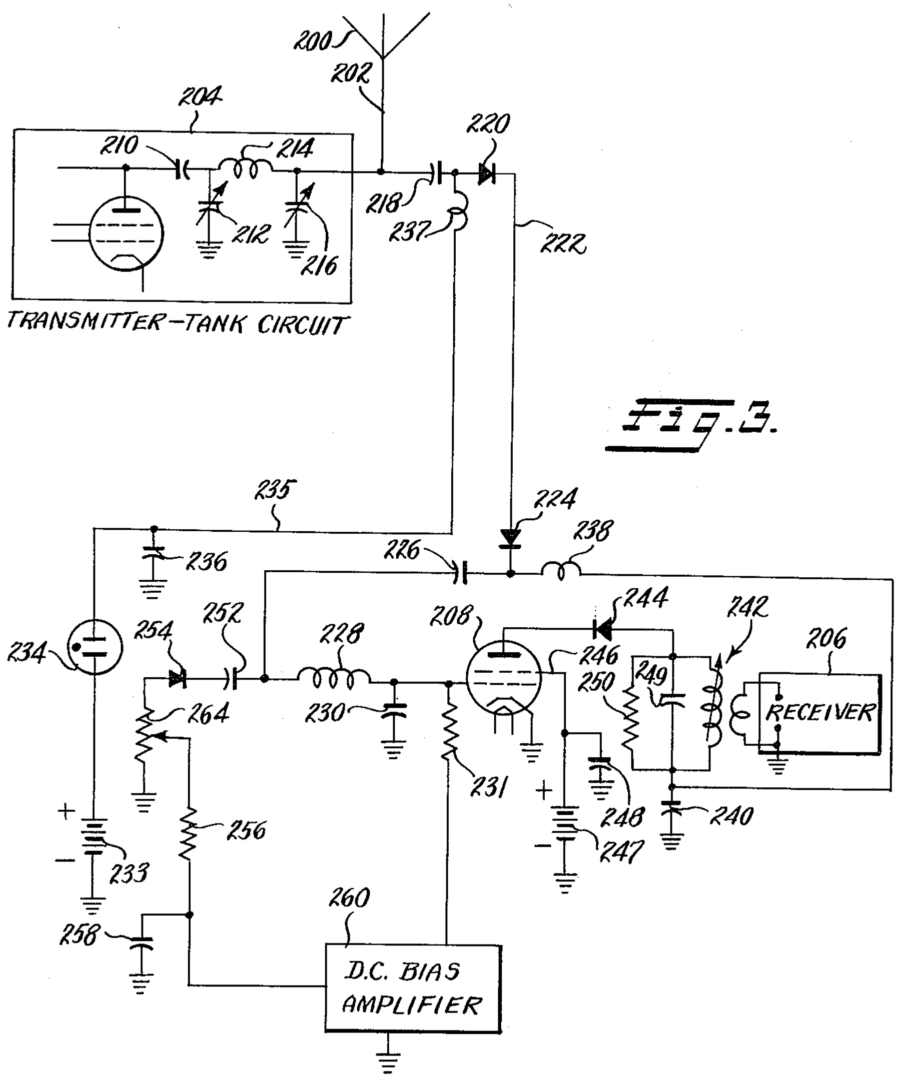
FIG. 3 is a diagram illustrating a practical embodiment of the invention.

A practical embodiment of the invention is exemplified in FIG. 3. In this figure, there is illustrated an antenna 200 connected by an antenna feed line 202 to both a transmitter 204, only a portion of which is shown, and a receiver 206. There is also shown a gating or switching tube 208. A transmitted signal is fed to the antenna via a capacitor 210 and tank resonance circuit including capacitor 212 and inductance coil 214. A tank circuit antenna loading capacitor 216 is also included as part of the transmitter tank circuit, whose function will later on be described in detail. An incoming signal, when the gating tube is conductive, as will be described, will travel from the antenna 200 via line 202 and a D.C. blocking capacitor 218, to semiconductor diode 220, thence via remote unit coupling line 222, in the form of a low capacitance coaxial line, through semiconductor diode 224, close to the receiver, D.C. blocking capacitor 226, a tuned input consisting in part of inductance 228 and variable capacitor 230 to resistor 231, which returns to ground through the D.C. bias amplifier, the signal voltage developed across the resistor 231 being fed to the number one grid of tube 208. The signal on the number one grid controls the flow of plate current through the tube when it is in conductive condition. Plate current to the tube is furnished from a source of D.C. potential 233, the negative end of which is grounded. The positive end of the source of potential is fed via a neon indicating light 234, shielded cable 235 provided with an R.F. filter capacitor 236 and R.F. choke 237 to diode 220, biasing the same and subsequent diodes for signal conduction, line 222, diode 224, a filter including inductance 238 and R.F. filter capacitor 240, the primary of a transformer 242, diode 244 and the anode of tube 208, thence, when the tube is conductive, through the tube to ground and back to the source of potential. The tube is normally rendered conductive by reason of a sufficiently high positive potential imposed on a line 246, as by a battery 247, connected to the number two or screen grid in the tube, a filter capacitor 248 being coupled into the line. The screen grid prevents regenerative feed back when the tube is operating as an amplifier during reception. Also, since the screen grid remains at positive potential imposed by the D.C. source 247 when the tube is nonconductive, any residual current through the tube is from the screen grid to cathode, rather than from the anode to cathode. This eliminates the possibility of leakage current from the D.C. source 233 through the diodes 220, 224 and 244 to the anode of the tube. The conductivity of the tube can be ascertained by inspection of the neon 234. When the tube is conductive, the current in the plate circuit is varied and is transmitted via the secondary of the transformer 242 to the receiver 206. The primary of the transformer is tuned to the incoming signal by means of a capacitor 249, either the capacitor or primary coil being made variable, and a loading resistor 250 is added to lower the Q of the circuit and thus broad band the tuning.

A potential control on the number one grid of the tube 208 is effected in a shunt circuit as follows: Connected to the line joining capacitor 226 and inductance 228 is a terminal of a capacitor 252 whose opposite terminal is connected via a diode 254, the one end of a resistor 256 of a D.C. filter consisting of the resistor and a capacitor 258, the opposite end of the resistor being connected to a D.C. bias amplifier 260 in turn connected via the resistor 231 to the number one grid of the tube. A potentiometer 264 connected at one end to the line leading to the diode 254 and whose opposite end is grounded, controls the potential existing in the shunt circuit. The circuit components and D.C. bias amplifier are such that when an incoming signal is transmitted along the line 222 very little voltage is conducted via capacitor 226 into the shunt line and therefore the number one grid has but a small negative voltage imposed upon it, far less than sufficient to overcome the positive voltage on grid number two; therefore the tube is conductive and performs as an R.F. amplifier during reception of incoming signals. When, however, the transmitter is operative and a signal is transmitted over the antenna, the voltage in line 222 is much greater and the resulting voltage on grid number one of tube 208 is sufficient to overcome the effect of grid number two and is sufficient to drive the tube to cut-off.

It should be noted that the tuned input 228, 230 to the antenna switching tube in conjunction with the transmitter loading capacitor 216 forms a pi tuned network which employs the same loading capacitor as the transmitter tank circuit. As a result, optimum loading or matching of the antenna to the transmitter tank circuit also provides optimum antenna matching to the pi tuned circuit. The tuned circuit 228, 230 is designed to have a considerably higher Q than that of the resonant transmitter tank circuit. Because of the higher Q of the tuned circuit 228 and 230, signal voltage is absorbed by the tuned input to the switching circuit. This signal voltage at the number one control grid of tube 208 is actually increased, rather than decreased. The antenna feed line may terminate in a coupling unit which is branched so that on the one hand the line can be directly connected to the transmitter output and on the other hand directly coupled to the switching arrangement making it possible to make easy connection to a transmitter without mechanical disturbance thereof. Also it should be noted, a sharp peak in the signal strength and selectivity of the received signal is attained when both the transmitter tank resonance capacitor 212 as well as capacitor 230 are tuned to the received signal frequency.

It is desirable that diode 220 be positioned as close to the antenna feed line 202 as possible. Any appreciable length of cable attached to the antenna feed line would absorb R.F. energy and affect the feed line impedance. Diode 224 is added to the circuit in order to prevent a resonant condition between the internal capacitance of diode 220 and the remote unit coupling line 222, during transmission; otherwise the capacitance of diode 220 when reverse biased is such that it could series resonate with the coupling line 222. This would permit excessive R.F. energy to be coupled through diode 220. Diode 224 opens the remote unit coupling line at the opposite end of the line and eliminates the possibility of coupling line-diode resonance.

Diode 244 is added to the circuit in order to illustrate a most simple application of the invention. In the case of an electron tube in a cut-off condition, if the signal coupled through the tube's internal capacitance is more than can be tolerated, the only additional part required to increase the signal isolation is the diode itself. The addition of diode 244 interferes very little with the operation of the tube as an R.F. signal amplifier because the diode is forward biased by the D.C. current through it to the anode of the electron tube. As D.C. conduction through the tube is cut off during transmission, the diode 244 is no longer forward biased and a D.C. return circuit this diode no longer exists. As a result, the diode assimilates a reverse biased condition and becomes a high impedance to R.F. current flow. The added impedance of this diode virtually eliminates the existence of signal voltage across the primary of the transformer 242, during transmission.

Obviously although the invention has been illustrated in an application to the signals on an antenna and in connection with a transmitter, the switching device could be utilized with any two divergent sources of signal, or where an increase in signal isolation is desired.

Having thus described the invention, what is claimed is:

1. A transmit-receive switching circuit including a transmitter, a receiver, a common antenna for the two and a switching tube including an anode grid and grounded cathode for controlling the application of signal from the antenna and transmitter to the receiver, a line directly connecting the antenna and transmitter, a line including a semiconductor diode in series therewith leading to said receiver, a source of D.C. potential, connections between said source and said diode and, in series, through the anode and cathode of said tube to bias the diode in a forward conducting condition, whereby an incoming signal on the antenna will be transmitted to the receiver, and means under control of voltages emanating from the transmitter when the same is in operation for inhibiting the flow of D.C. current through the diode and tube, to thereby inhibit the transmission of signals through the diode to the receiver, said means including a second diode and resistor, connected in series, the non-diode connected end of the resistor being grounded and the non-resistor connected pole of the second diode being coupled with the antenna, and a line connected between the grid of the tube and the junction between the second diode and the antenna.

2. A transmit-receive switching circuit including an antenna connected with both a transmitter and receiver, a semiconductor diode in series in the connection from said antenna to said receiver, a switching electron tube having an anode, a cathode and two control grids and having its anode connected to the line from the diode to the receiver, a source of D.C. potential having its positive end connected to the diode to forward bias the same and its negative end connected to the cathode of the tube, connections with said antenna and one of said grids and including a rectifier to establish a negative potential on said grid when the transmitter is operating, sufficient to cut off the tube and remove the forward bias and D.C. return path on said diode, thereby the transmitted signal does not reach the receiver, and means connected with the other of said grids to maintain the same at a positive constant D.C. potential, to render the tube conductive in the absence of operation of the transmitter, whereby said diode is rendered operative to pass signals to the receiver from the antenna.

3. A transmit-receive switching circuit including an antenna, a transmitter, a receiver, a switching electron tube having an anode, a cathode and two control grids, a D.C. source of potential and a semiconductor diode, a first conductor connecting said antenna and the transmitter, a second conductor connecting said antenna and one terminal of said diode, a third conductor from the positive terminal of said D.C. source to said one terminal of said diode to bias the diode in a forward direction, a fourth conductor connecting the other terminal of said diode and the anode of said tube, said fourth conductor including a coupling to said receiver, a fifth conductor connnecting said cathode and the negative terminal of said D.C. source, a sixth conductor from said other terminal of said diode to a first one of said control grids in said tube, a seventh conductor from said sixth conductor and including rectifying means to apply negative potential to said first grid, and means for applying a constant D.C. positive potential to said second grid, whereby the diode is forward biased for signal conduction from the antenna to said receiver when the transmitter is inoperative and the receiver is cut off from the transmitter when the transmitter is operative.

4. The structure of claim 3 wherein the diode is located close to the antenna and a second semiconductor diode is connected in series in the fourth conductor and close to the receiver to reduce resonance between the internal capacitance of the first diode and the length of fourth conductor between the diodes.

5. The structure of claim 3 wherein the sixth conductor has in series therewith a tuning circuit comprising a series inductance and a shunt capacitor and there exists as part of the transmitter tank circuit, another capacitor at the output of the transmitter effectively forming a pi filter with the inductance and capacitor in the sixth conductor whereby signal absorption by the transmitter is hindered and the signal voltage received on the antenna fed to the receiver is strengthened.

6. The structure of claim 3 wherein the seventh conductor in addition has incorporated therein a D.C. bias amplifier.

7. The structure of claim 3 wherein the fourth conductor includes in series between the coupling and the anode, a semiconductor diode, whereby increased signal isolation between the transmitter and the receiver, in the cut-off condition of the tube, is attained.

8. The structure of claim 3 wherein there is included in series in the third conductor, an indicating light to indicate the flow of forward biasing current through the diode and nonoperation of the transmitter.

9. In a switching circuit involving a transmitter and a receiver, a grid controlled amplifier electron tube having an anode and cathode, means under control of the transmitter for applying a potential to the grid such as to render the tube conductive or nonconductive, a conductor connected with the input to the receiver feeding signals at high frequencies to the anode of said tube, said conductor including a diode in series with the anode, whereby when the tube is conductive the diode is forward biased to conduct high frequencies therethrough and when the tube is cut off the forward bias on the diode is removed so that the diode isolates the receiver from high frequencies emanating from the transmitter and in the conductor feeding the receiver.

References Cited by the Examiner

UNITED STATES PATENTS

| | | | |
|---|---|---|---|
| 2,806,136 | 9/1957 | Harris et al. | 325—22 |
| 2,924,704 | 2/1960 | Horowitz et al. | 325—22 |
| 2,939,949 | 7/1960 | Curtis | 325—21 X |
| 3,117,241 | 1/1964 | Paynter et al. | |

DAVID G. REDINBAUGH, *Primary Examiner.*

J. W. CALDWELL, *Assistant Examiner.*